O. W. MINARD.
Tape Measure.
No. 28,101.
Patented May 1, 1860.
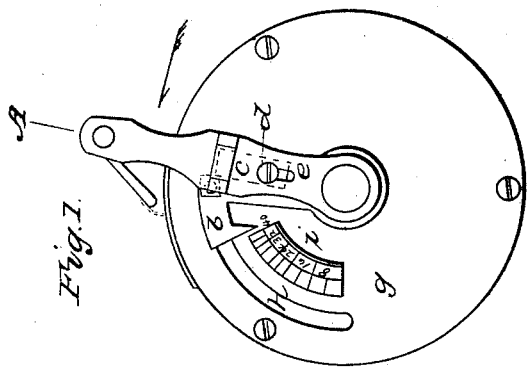
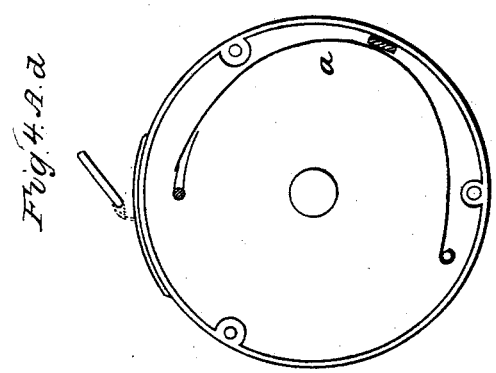
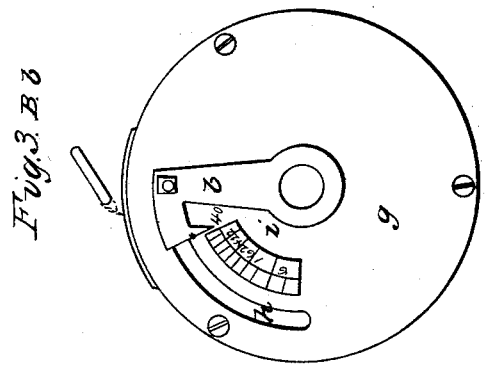
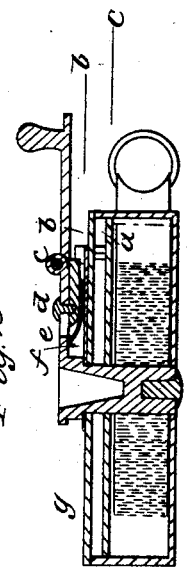
Witnesses
Theodore S. Burg
[signature]
Inventor
O. W. Minard

UNITED STATES PATENT OFFICE.

O. W. MINARD, OF WATERBURY, CONNECTICUT.

MEASURING-TAPE.

Specification of Letters Patent No. 28,101, dated May 1, 1860.

*To all whom it may concern:*

Be it known that I, O. W. MINARD, of Waterbury, in the county of New Haven and State of Connecticut, have invented certain new and useful Improvements in Instruments Known as "Measuring-Tapes;" and I do hereby declare the following to be a full and exact description thereof, and the accompanying drawings are referred to as a part of the specification, wherein—

Figure 1 is a plan of the instrument; Fig. 2 a vertical section at the line A, *a*, of Fig. 1; Fig. 3 a horizontal section at the line B, *b*, of Fig. 2; and Fig. 4 a horizontal section at the line C, *c*, of Fig. 2.

In all the figures like parts are indicated by the same letters.

My said invention consists in the use of a spring, a graduated plate, and an indicator, in combination with the measuring tape, to determine the tension necessary to be given to the tape, to make accurate measurements with the tape will hereinafter be shown and described.

In the accompanying drawings the tape is represented in a case as is usual, and the case is provided with an additional chamber between the tape and the upper plate of the case as shown at Fig. 2, A, *a*. In said chamber is the spring (*a*) as shown at (*a*) Fig. 4, C, *c*, and Fig. 2, A, *a*. To one end of the spring is attached a piece of metal which carries the indicator (*b*). Said piece of metal passes up through the curved slot or opening (*h*) cut through the plate for that purpose. See (*h*) Fig. 1, and (*h*) Fig. 3, B, *b*.

The spindle that carries the tape is connected with a crank (as is usual) and on the underside of the crank is a slide (*c*) which is held by the rivet (*d*) and is guided by the slot or opening (*e*) through which the rivet passes. See Fig. 1, and Fig. 2, A, *a*. The slide (*c*) is provided with a spring (*f*) which is to hold the slide (*c*) in the desired place as shown at (*f*) Fig. 2, A, *a*. The top plate (*g*) of the case is graduated as shown at (*i*) Fig. 1, and (*i*) Fig. 3, B, *b*, and this graduation in combination with the indicator or pointer (*b*) and spring (*a*) serves to determine the degree of tension necessary to be given to the tape to make a correct measurement.

The graduation on the plate (*g*) is made thus: Place the end of the tape on the end of a standard measure, unwind $8\frac{3}{12}$ feet of the tape, now connect the crank with the spring (*a*). This is done by pushing the slide (*c*) toward the joint of the crank, that it (the slide) may come in contact with the piece of metal that is attached to the spring (*a*), hold the tape firmly in the hand and let the crank move freely while the tape is extended over the standard measure until the figure 8 or 8 foot mark on the tape will correspond with the 8 foot mark on the standard measure, note the point or place indicated by the pointer on the plate to be graduated, mark that point or place with a line and figure 8 the line to radiate from the axis of the spindle. Now disconnect the crank from the spindle by pushing the slide (*c*) toward the spindle which the tape is wound on, unwind 8 feet more of the tape, (marking $11\frac{3}{12}$ feet of tape out of the case) connect the crank with the spring (*a*) by moving the slide (*c*) toward the joint in the crank as before, then place the end of the tape on the end of the standard measure, hold the case firmly in the hand, allow the crank to move freely and act on the pointer and spring (*a*) while the tape is extended until the 11 foot mark on the tape is exactly even with the 11 foot mark on the standard measure, note the point indicated by the pointer and mark with a line and 11. Now disconnect the crank from the pointer and spring (*a*), run out 8 feet more of tape (marking 24 feet) connect the crank with the pointer and spring (*a*), then extend the tape over the standard measure as before directed, note the point on the plate indicated by the pointer, mark with a line and 24 as directed for the 8 and 11 feet sections, and so proceed until the plate is graduated for the whole length of the tape in 8 foot sections, or longer or shorter sections (in the same way) as may be desired. The spaces between the figures may be graduated with lines indicating 1, 2 or 4 feet as shown at (*i*) Fig. 1, and (*i*), Fig. 3, B, *b*.

In using my improved tape after sufficient length of tape is run out, (say 3 or 4 inches more than the length to be measured) the crank should be connected with the pointer (*a*), by pushing the slide (*c*) toward the joint in the crank. Then place one end of the tape on the point to be measured from and extend the tape until the pointer indicates on the graduated plate the number of feet measured with the tape, either by the figures on the graduated plate or by a proportionate part of the space between the figures.

To enable others to make use of my improvement I will give the necessary directions for making two measurements one 8 and the other 11 feet long. First unwind $8\frac{3}{12}$ feet of tape, then connect the crank with the pointer and spring ($a$) by pushing the slide ($c$) toward the joint of the crank, hold the case firmly in the hand, allow the crank to move freely and press against the piece of metal that is attached to the spring ($a$) and carries the pointer ($b$), now place the end of the tape on the point to be measured from, extend the tape until the pointer ($b$) is over the 8 feet mark on the graduated plate. The point indicated by the 8 foot mark on the tape is the measurement supposed to be correct or much nearer than can be measured with the common tape without my improvement.

To make a 11 feet measurement unwind $11\frac{3}{12}$ feet of tape, connect the crank, pointer and spring ($a$) as before directed, place the end of the tape at the point to be measured from, extend the tape until the pointer stands over the 11 foot mark on the graduated plate, the point indicated by the 11 foot mark on the tape is near a correct measurement or approximates much nearer to a correct measure than can be made without a spring and pointer connected with the tape.

If 12 feet is to be measured place the end of the tape at the point to be measured from, extend the tape until the pointer stands over the line between 8 and 11 on the graduated plate.

If 9, 10 or 11 feet are to be measured after locating the end of the tape extend it until the pointer indicates a proportionate part of the space between 8 and 12.

The above directions must be observed for measuring any and all lengths with my improved measuring tape. The tape as it lies loose and straight on a flat surface should be a little short of the measure that it may be extended to make the full measure or length and operate on the spring ($a$).

What I claim as new and desire to secure by Letters Patent, is—

The employment substantially as described, of the spring ($a$) the pointer ($b$) and the graduated plate ($i$) in combination with the measuring tape for the purpose specified.

O. W. MINARD.

Witnesses:
NATHAN J. BUEL,
THEODORE S. BUEL.